April 26, 1960  J. RODER ET AL  2,934,202
SPIRAL VIBRATORY CONVEYOR
Filed Sept. 5, 1956  6 Sheets-Sheet 1

INVENTOR.
JOSEF RÖDER
FRITZ STOFF
BY *Christy, Parmelee & Strickland*
ATTORNEYS.

INVENTORS
JOSEF RÖDER
FRITZ STOFF
BY Christy, Parmelee & Strickland
ATTORNEYS.

INVENTORS
JOSEPH RÖDER
FRITZ STOFF
BY
ATTORNEYS.

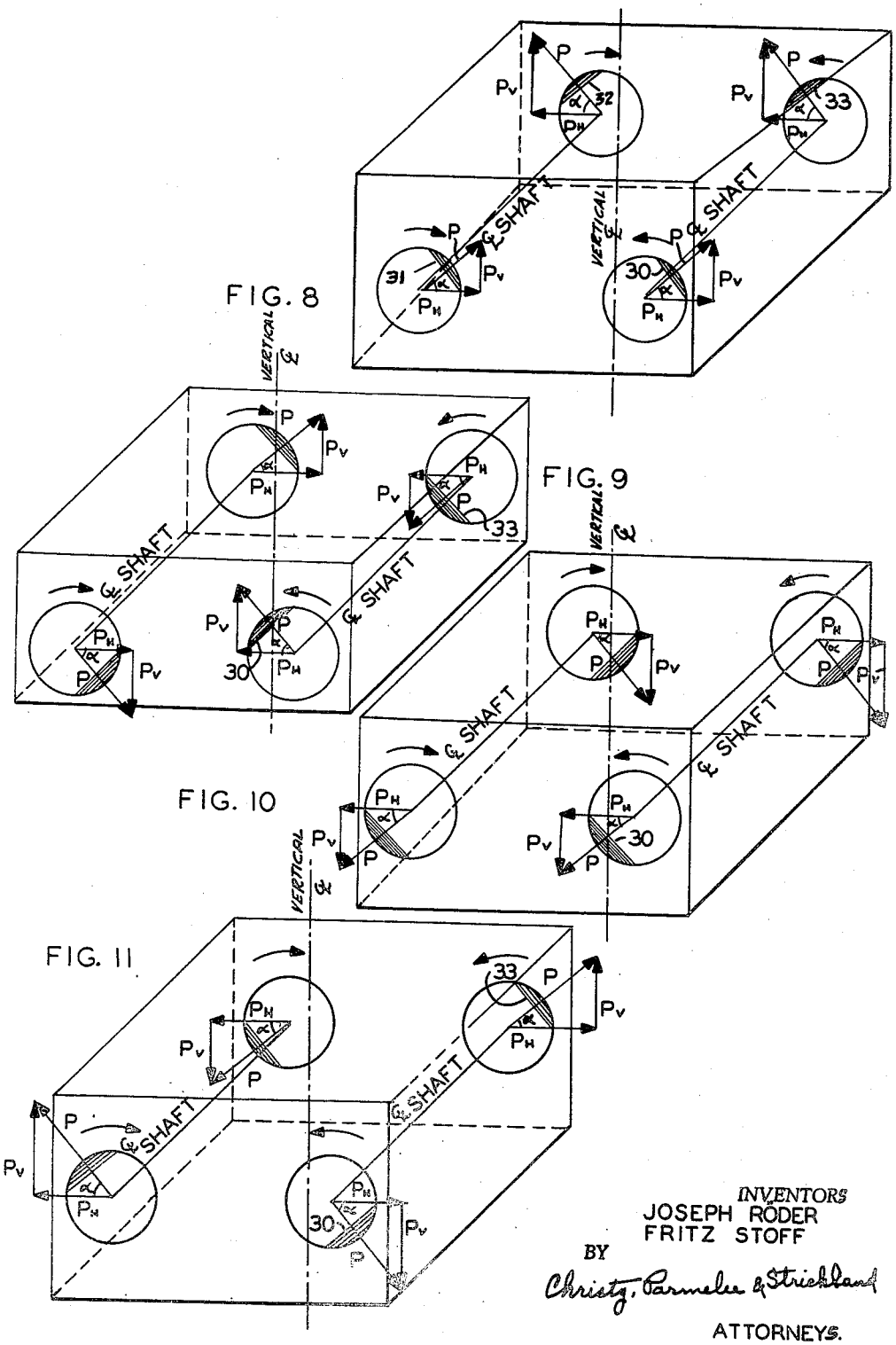

United States Patent Office 2,934,202
Patented Apr. 26, 1960

2,934,202

SPIRAL VIBRATORY CONVEYOR

Josef Roder and Fritz Stoff, Darmstadt, Germany, assignors, by mesne assignments, to Dravo Corporation, Pittsburgh, Pa., a corporation of Pennsylvania Application September 5, 1956, Serial No. 608,015

10 Claims. (Cl. 198—220)

This invention relates to vertical spiral vibratory conveyors for flowable materials, for example, sand, sawdust, grain, milling products, sugar, coke, coal, etc., comprising spirally disposed resiliently supported freely oscillable chute means actuated by unbalanced weight vibrators to execute oscillation thrusts having vertical and horizontal components, and adapted to convey material upwardly. The instant application is a continuation-in-part of the co-pending application, Serial No. 209,728, filed February 7, 1951, now abandoned.

The various objects and features of the invention will be briefly outlined below.

Spiral vibratory conveyors have been employed for downwardly conveying flowable material; the conveying of material in upward direction was heretofore impracticable because it could have been obtained in the most favorable circumstances only along inclines below angles of 5° and at a considerable sacrifice of efficiency and handling capacity.

The principal object of the invention is to provide apparatus of this type which is capable of conveying flowable materials, substantially without increase in the expenditure of energy, in horizontal direction as well as effectively upwardly or downwardly, if desired, along inclines at angles of 20° and more, depending on the type of material, its angle of repose and its condition, for example, as to moisture content.

This principal object is realized by the provision of resiliently, freely oscillable chute means, helically disposed about a vertically extending axis, and actuated by a plurality, for example, by two or more pairs of synchronously rotatable oppositely effective unbalanced weight vibrators whose horizontal oscillation phase components are displaced by 180° so as to produce oscillation thrusts of relatively high frequency and relatively small amplitude and having perpendicular and horizontal components. The unbalanced weight vibrators produce directional thrust forces with an inclination greater than the angle of inclination or pitch of the spiral chute means, thereby forcing the freely oscillable system to execute oscillations along lines extending helically to convey the material along the chute means.

The above indicated and additional objects and features will be brought out in the course of the detailed description which will presently be rendered with reference to the accompanying drawings. In these drawings, Figs. 1 and 2 are diagrams showing oscillation curves applied in carrying the invention into practice;

Figures 8, 9, 10 and 11 are isometric force diagrams.

Figure 1:
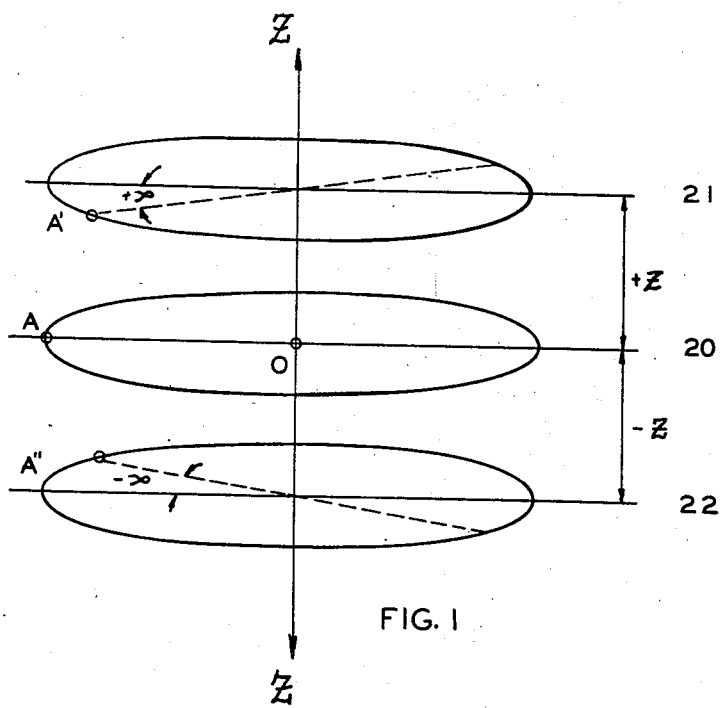
Figure 2:
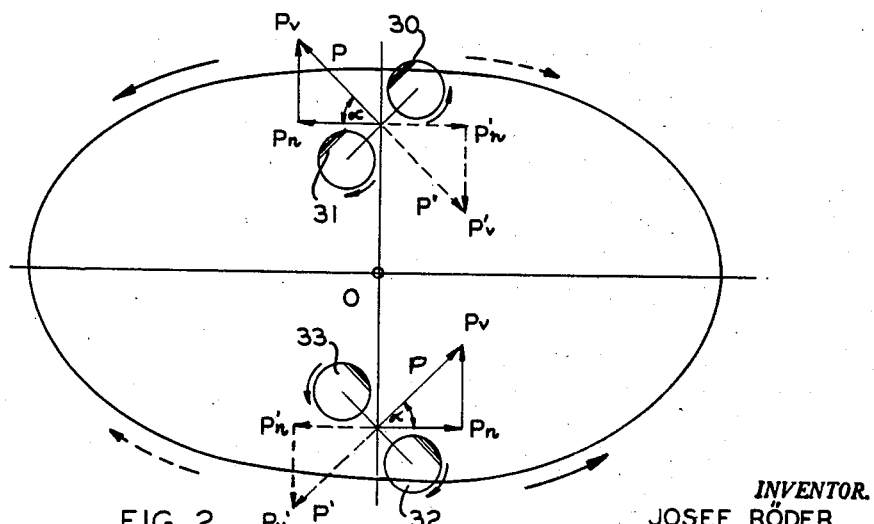

Referring first to Figs. 1 and 2, numerals 30—31 and 32—33 indicate pairs of unbalanced weight vibrators which actuate a chute having the axis Z—Z. Numeral 20 indicates the sectional plane of the axis of the oscillation system having in its normal or resting position a mass repose at point A. At 21 the same plane is indicated in its highest and at 22 in its lowest oscillating position. The unbalanced weight masses in each pair 30—31 and 32—33 rotate synchronously in opposite directions. The masses 31 and 32 mounted on one shaft rotate in identical direction, and coupled for concurrent rotation therewith are the masses 30 and 33 mounted upon a second shaft for rotation in an opposite direction.

In the position in which the masses are shown in Fig. 2, the resulting thrust forces P of both pairs of masses are directed upwardly. The forces P comprise the horizontal components $P_h = P \cdot \cos \alpha$ and the vertical components $P_v = P \cdot \sin \alpha$. They therefore produce a left-hand rotary moment about the ideal axis O and simultaneously an upward thrust motion along the axis O in the direction of the terminal position 21 indicated in Fig. 1. In position 21, the mass repose point A assumes the position A' which is definitely determined by the cylinder coordinates $-Z$ and $-\varphi$.

After the unbalanced weight masses have rotated by 180°, the thrust-generating forces P' are directed obliquely downwardly. They induce, by the components $P'_h$, a right-hand rotary moment about the ideal axis O and, by the components $P'_v$, a downward thrust motion of the chute in the direction of the bottom terminal position 22 indicated in Fig. 1. In this position 22, the point A appears at A'' as determined by the cylinder coordinates $-Z$ and $-\varphi$.

The foregoing explanation will be more readily understood upon reference to the isometric force diagrams of Figs. 8 to 11 wherein the rotating vibrators 31, 32 are mounted on one shaft and the vibrators 30 and 33 are mounted on another shaft at opposite sides of the vertical axes of the chute. When the shafts are rotated in opposite directions and the centers of gravity of the masses 30 to 33 are represented by the shaded portions, and such shaded portions on each shaft displaced by approximately 90°, the directional force P is indicated at successive quadrants of the arc of rotation of each such vibrator. Referring now to Fig. 8, the vertical components $P_v$ at opposite sides of the vertical axes are all directed vertically and the horizontal components $P_h$ of each shaft displaced 180° so that at each side of the vertical axes the $P_v$ components extending in one direction form with the oppositely disposed $P_h$ components a couple acting at the respective sides of the vertical axes.

Referring now to Fig. 9 of the drawings wherein the respective masses 30 to 33 inclusive are displaced about 90° about their axes of rotation and provide force components P whose vertical components of the masses on each shaft are oppositely directed and the horizontal components of each shaft are directed in the same direction so that no force couple is formed. In Fig. 10, however, the vertical force components are all directed downwardly and the horizontal force components of each shaft are again directed in opposite directions to form force couples as in Fig. 8. In Fig. 11 the horizontal and vertical force component conditions are the duplicate of Fig. 9.

It will be apparent, therefore, that for each complete rotation of each shaft the vertical force components are alternately directed upwardly and downwardly and at the same time the horizontal force components combine therewith to form a couple imparting forces in an approximately helical path to the chute means.

It will be seen from the foregoing explanations that the path of the repose point A between the positions A' and A" extends along a helical line.

The above indicated drive means may be disposed inside or outside of the spiral chute or above or below the chute or along a plane extending intermediate the opposite ends of the chute.

Means may be provided to adjust the frequency of the oscillations as well as the amplitude thereof so as to increase the thrust angle of the oscillations, for example, for the purpose of providing for a turbulent flow of the upwardly conveyed material.

Figure 3:
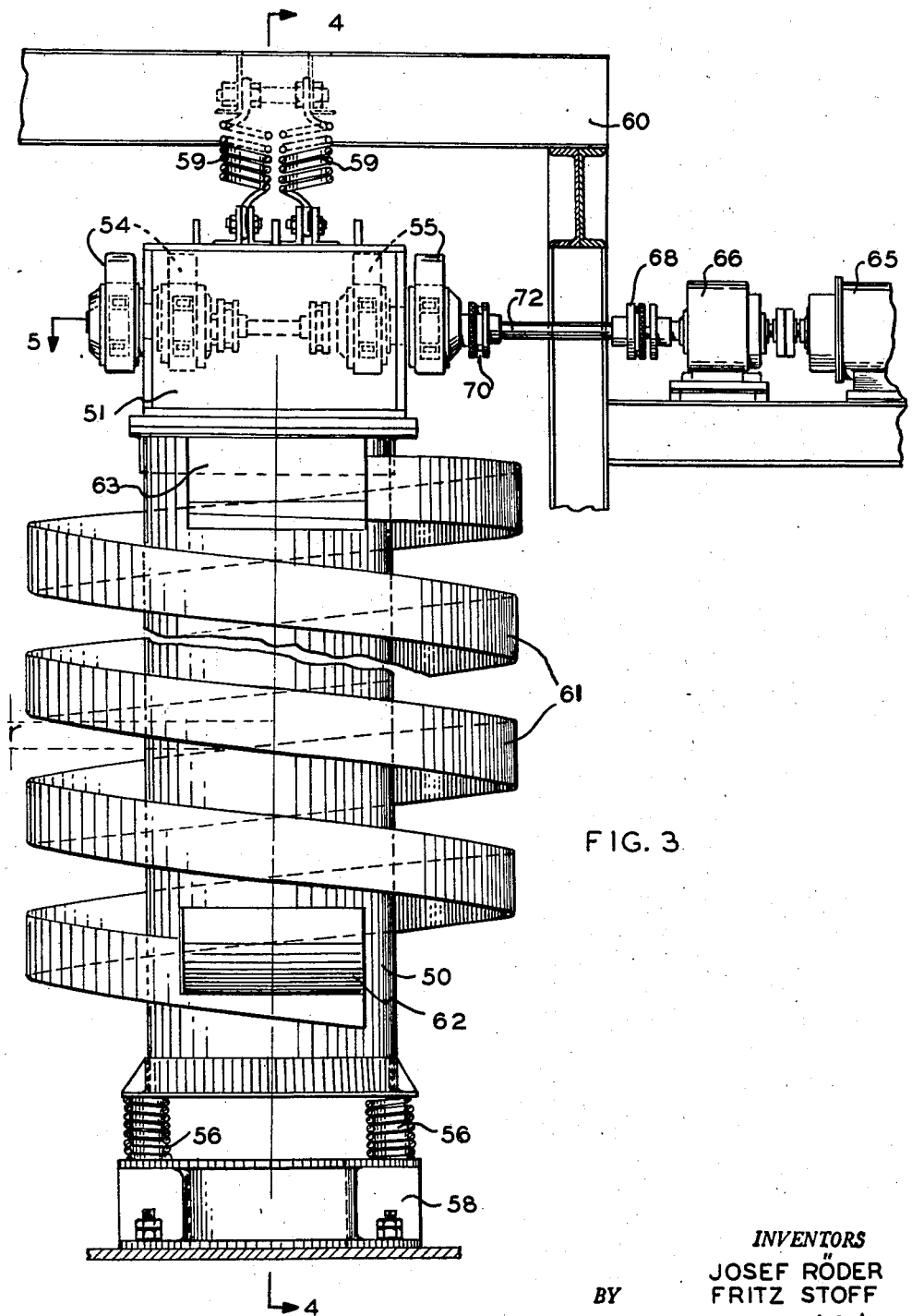
Fig. 3 shows an embodiment of the invention in elevational view.
Figure 4:
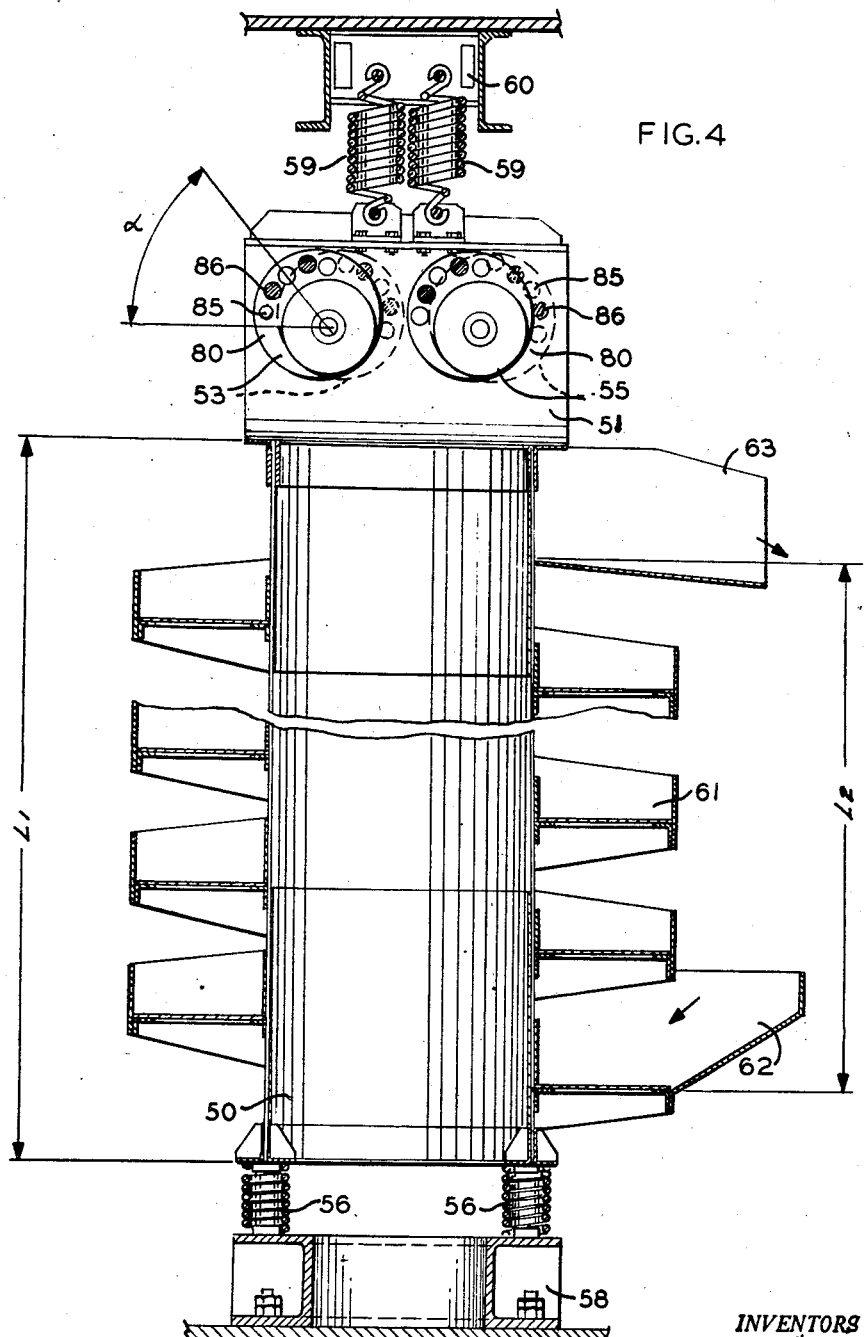
Fig. 4 is a sectional view along line 4—4 of Fig. 3.
Figure 5:
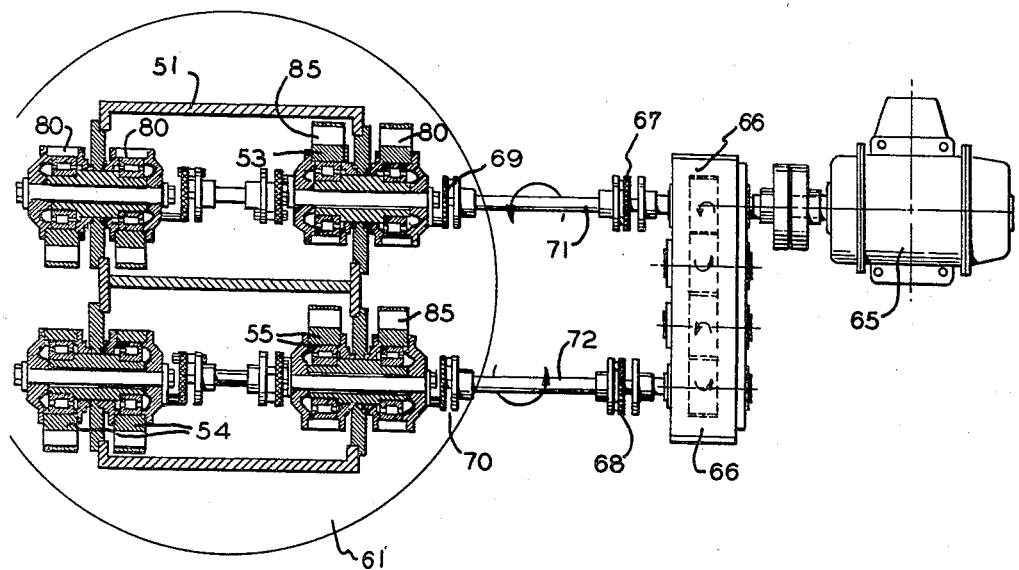
Fig. 5 shows the unbalanced weight vibrators employed in Fig. 1, in sectional view taken along line 5—5 of Fig. 1 and the drive means therefor in elevational view.

Referring now to Figs. 3, 4 and 5, there is provided a tubular central carrier 50, made for example of sheet iron, supporting on top thereof a casing 51 containing and holding a plurality of pairs of unbalanced weight vibrators 52, 53, 54, 55 shown more in detail in Fig. 5. Springs 56 support the tubular carrier 50 at the bottom, these springs resting upon a base 58, and springs 59 hold the top of the casing 51 relative to frame means 60. A helically extending chute 61 is secured to the tubular carrier 50. Numeral 62 indicates the material feed inlet at the bottom, and numeral 63 the material discharge at the upper end of the chute. The carrier 50 supporting the chute 61 and the casing 51 containing and holding the pairs of unbalanced weight vibrators 52—55 are thus suspended between the springs 56 and 59 for free vibratory or oscillating motion.

The drive for the unbalanced weight vibrators comprises a motor 65, gear means 66, articulated couplings 67, 68 and 69, 70, and drive shafts 71 and 72. The drive shaft 71 is coupled with the right hand unbalanced weight vibrator element of the pair 53 which is connected with the corresponding left hand element by means of a shaft 75, such shaft being coupled over articulated coupling disks with the left hand pair of unbalanced weight vibrators 52. The drive shaft 72 is in similar manner coupled with the right and left hand pairs of unbalanced weight vibrators 54 and 55.

The shafts 71 and 72 and therewith the pairs of unbalanced weight vibrators respectively coupled thereto, rotate in opposite direction. The pairs of unbalanced weight vibrators 52 and 54 are displaced an angular distance greater than zero degrees and less than 180° relative to the pairs of vibrators 53 and 55. The pairs of vibrators 54 and 55 rotate in a direction opposite to the direction of rotation of the pairs of vibrators 52 and 53.

The angle of inclination $\gamma$ or pitch of the helical chute, which is in a practical embodiment on the order of about 10° and the angle $\alpha$ for the direction of the thrust imparted by the operation of the unbalanced weight vibrators, which is greater than $\gamma$, is apparent from Figs. 3 and 4. The thrust is given by $\alpha$ minus $\gamma$.

It will be seen from the foregoing explanations that the direction of the resulting thrust forces generated by the unbalanced weight vibrators, that is, the angle of thrust, is, generally speaking, at least 20° steeper than the angle of inclination or pitch of the helically extending chute.

The angle of incline or pitch of the chute, and therewith the upward travel of the material, is affected by skin friction and by the angle of repose of the material. For efficient operation, the angle of incline or pitch of the chute must be less than the angle of repose of the material.

Rotary speeds for the drive of the unbalanced weight vibrators may be on the order of 1500 to 1800 r.p.m., with amplitudes of oscillation on the order of about 4 mm., measured along the median center line of the chute. The material-conveying speed at such speeds of rotation and amplitude of oscillations will be on the order of about 8 to 10 m./min., depending on the type of material and on the inclination of the chute turns.

In order to obtain a turbulent flow of material incident to its upward travel, which may be of advantage, for example, if partial drying of the material is to be accomplished, the thrust angle of the oscillations may be adjusted at more than 20° in excess of the angle of inclination of the chute turns, for example, at 30°, so that the direction of the generated thrust forces amounts to about 50° to the horizontal in the case of an inclination of the chute turns of about 20°.

The angle $\alpha$ may be changed or adjusted according to operational requirements, for example, by adjusting the unbalanced weight masses 80 of the pairs of vibrators 52 and 53 (Figs. 4 and 5) angularly so that the axis of symmetry S (Fig. 4) extends at a greater or smaller angle $\alpha$ to the horizontal. An analogous procedure applies of course to the vibrators 54 and 55. Another way to achieve the desired results is to provide the unbalanced weight masses 80 with a number of bores 85 formed therein and to insert into these bores suitable plugs 86. It is in this manner possible to regulate the angle of the directional thrust and also the magnitude of the thrust within sufficiently wide limits according to requirements by distributing the insert plugs as desired. The insert plugs are in Fig. 4 distributed symmetrically but may of course be distributed unsymmetrically.

The upward displacement of the material may also be varied by employing unbalanced weight masses which are not of uniform size but of different size; that is, the masses of the elements in the pairs 52 and 55 may be of different size from those of the elements in the pairs 54 and 53. Such modification will produce an elliptoid oscillating motion.

A practical embodiment may be made based on the following dimensions. The diameter of the tubular carrier 50 may be about 800 mm. The outer diameter of the chute 61 may be about 1600 mm. The length L1 of the tubular carrier 50 may be about 7 m. The height L2 of the travel of the material may be about 6 m.

Figure 6:
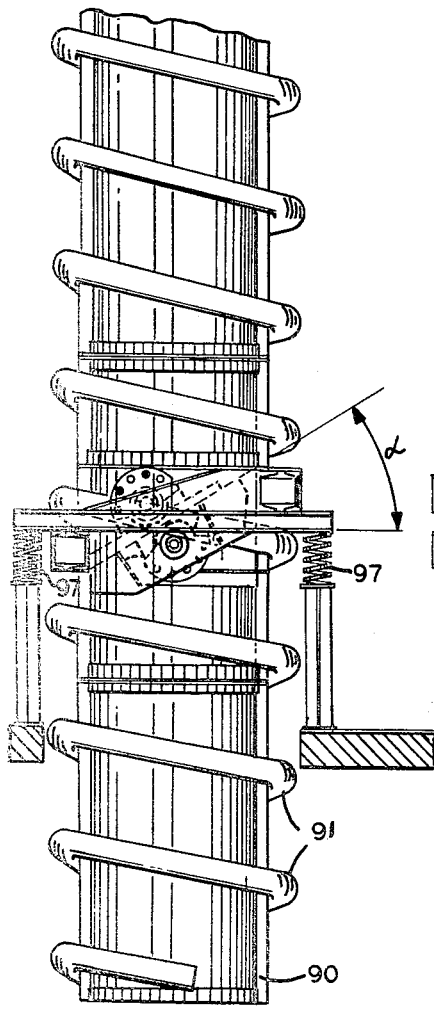
Figs. 6 and 7 are elevational views of another embodiment of the invention.
Figure 7:
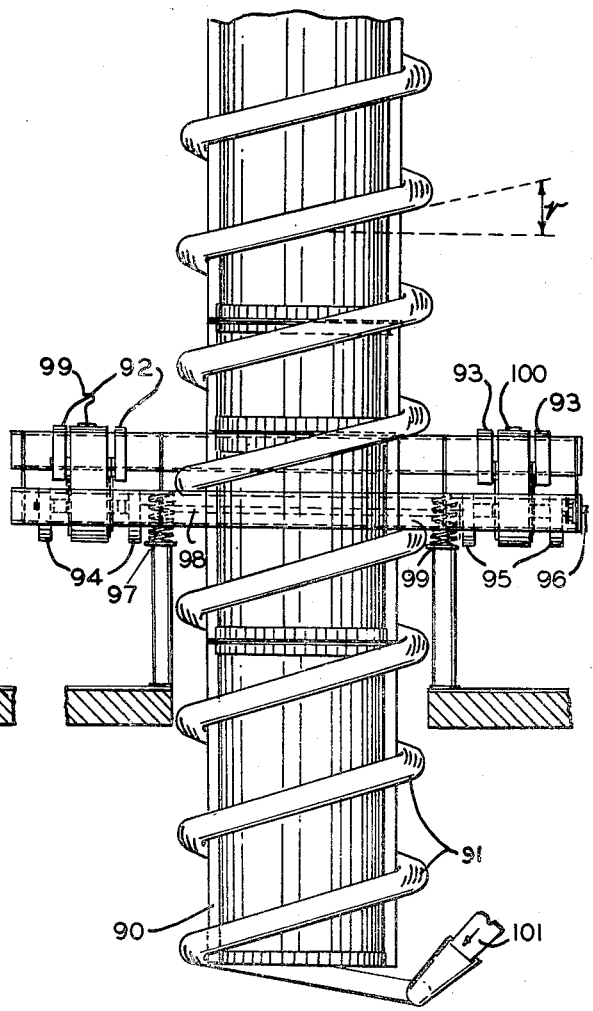

Figs. 6 and 7 show a conveyor comprising a tubular carrier 90 supporting a helically extending tubular material-conveying spiral chute 91 with an angle $\gamma$ of inclination or pitch of about 10°. The structure is suspended for free oscillation or vibration at a level extending at about $\frac{1}{3}$ of its total length. Numerals 92, 93, 94, 95 indicate unbalanced weight vibrators. The drive may be effected analogously to Figs. 3 to 5 by means of a motor (not shown) over a shaft 96. The carrier and therewith the tubular conveyor spiral may be mounted for free oscillation on springs 97. Numeral 98 indicates a shaft for interconnecting the unbalanced weight vibrators 95 and 94. Numerals 99 and 100 indicate gear means for driving the unbalanced weight vibrators 92 and 93 in a direction of rotation opposite to the direction of rotation of the vibrators 94 and 95. Numeral 101 indicates the inlet for the material to be upwardly conveyed within the chute 91.

Changes may be made within the scope and spirit of the appended claims.

We claim:

1. A vertical spiral vibratory conveyor comprising chute means disposed helically about a vertical axes and forming a material conveying path, means for freely oscillably supporting said chute means, and oscillation-generating means for imparting to said chute means relatively high-frequency small amplitude angularly disposed oscillating force having vertical and horizontal force components, said oscillation-generating means comprising a plurality of rotating unbalanced vibrators, means at opposite sides of said vertical axes for rotatably supporting a pair of said unbalanced vibrators, means synchronously rotating said vibrator supporting means in opposite directions, said rotating vibrators at each side of said vertical axes imparting oscillating directional forces to said chute at angles exceeding the angle of inclination of said chute means and whose horizontal force components are alternately displaced 180° in angular relation to each other, whereby said freely oscillable chute means is oscillating in an approximately helical path for the purpose of conveying the material upwardly along said chute means.

2. A conveyor according to claim 1, comprising means for adjusting said oscillation-generating means so as to adjust the forces generated thereby as to direction of thrust, magnitude and frequency.

3. A conveyor according to claim 1, wherein the angle of the oscillation thrust exceeds by a substantial amount the angle of inclination of said chute means.

4. A conveyor according to claim 1, wherein the angle of said oscillation thrust is adjusted to an inclination which exceeds by about 20° the inclination of said chute means.

5. A conveyor according to claim 1, comprising a carrier for said chute means about which said chute means is helically arranged, a casing mounted on said carrier at one end thereof, said casing containing said oscillation-generating means, drive means for said oscillation-generating means, and means for resiliently supporting said carrier and casing at least at one end thereof.

6. A conveyor according to claim 1, comprising a carrier for said chute means about which said chute means is helically arranged, frame means extending from said carrier, said oscillating-generating means being supported by said frame means, and means for resiliently supporting said frame means.

7. A conveyor according to claim 1, comprising a carrier for said chute means about which said chute means is helically arranged, frame means extending from said carrier at a level intermediate the opposite ends thereof, and means for resiliently supporting said frame means.

8. A conveyor according to claim 2, comprising unbalanced weight vibrators having masses of different size.

9. A conveyor according to claim 2, wherein said unbalanced weight vibrators are angularly set so that the axis of symmetry extends at a desired angle of thrust.

10. A conveyor according to claim 2, comprising unbalanced weight vibrators having masses in which are formed bores for selectively receiving plugs to adjust the weight thereof.

References Cited in the file of this patent

UNITED STATES PATENTS

| | | |
|---|---|---|
| 2,374,664 | Carrier | May 1, 1945 |
| 2,658,286 | Spurlin | Nov. 10, 1953 |
| 2,760,503 | Carrier | Aug. 28, 1956 |
| 2,827,157 | Takuzo Tsuchiya et al. | Mar. 18, 1958 |

FOREIGN PATENTS

| | | |
|---|---|---|
| 695,938 | Germany | Sept. 6, 1940 |